United States Patent [19]
Gute et al.

[11] Patent Number: 5,244,244
[45] Date of Patent: Sep. 14, 1993

[54] DUAL VISOR DESIGN FOR A VEHICLE

[75] Inventors: Robert M. Gute, Corunna; Douglas J. Wilson, Burtchville, both of Mich.

[73] Assignee: Plasta Fiber Industries Corp., Marlette, Mich.

[21] Appl. No.: 926,682

[22] Filed: Aug. 6, 1992

[51] Int. Cl.$^5$ ............................................. B60J 3/02
[52] U.S. Cl. ................................. 296/97.8; 296/97.6; 296/97.9; 248/231.8
[58] Field of Search .................... 296/97.6, 97.8, 97.9; 248/231.8, 278

[56] References Cited

U.S. PATENT DOCUMENTS

| | | |
|---|---|---|
| 2,681,825 | 12/1952 | De Lyra . |
| 2,823,950 | 2/1958 | Harris ................................ 296/97.6 |
| 2,965,416 | 8/1958 | Dryden . |
| 3,556,585 | 1/1971 | Binder . |
| 4,275,917 | 6/1981 | Marcus . |
| 4,363,512 | 12/1982 | Marcus . |
| 4,521,047 | 6/1985 | Saxman . |
| 4,570,991 | 2/1986 | Lystad . |
| 4,580,829 | 4/1986 | Matheopoulos . |
| 4,666,205 | 5/1987 | Nakagawa . |
| 4,681,363 | 7/1987 | Hemmeke et al. . |
| 4,762,359 | 8/1988 | Boerema et al. . |
| 4,783,111 | 11/1988 | Hemmeke et al. ............... 296/97.8 |
| 4,858,982 | 8/1989 | Dykstra et al. .................... 296/97.5 |
| 4,913,483 | 4/1990 | Jasso ................................ 296/97.6 |
| 4,919,468 | 4/1990 | Abu-Shumays et al. .......... 296/97.4 |
| 4,921,300 | 5/1990 | Lawassani et al. ............... 296/97.11 |
| 4,925,232 | 5/1990 | Hemmeke et al. ................ 296/97.8 |
| 4,940,273 | 7/1990 | Konishi ............................ 296/97.6 |
| 4,950,021 | 8/1990 | Vandagriff ....................... 296/97.6 |
| 4,974,896 | 12/1990 | Konoshi ........................... 296/97.6 |
| 4,982,992 | 1/1991 | Vu et al. ........................... 296/97.6 |
| 5,015,027 | 5/1991 | Rifaat ............................... 296/97.6 |
| 5,033,528 | 7/1991 | Volcani ........................ 296/97.9 X |
| 5,071,186 | 12/1991 | Hemmeke et al. ................ 296/97.9 |
| 5,080,420 | 1/1992 | Hemmeke et al. ................ 296/97.1 |

FOREIGN PATENT DOCUMENTS 1124677 10/1956 France ............................... 296/97.9

Primary Examiner—Dennis H. Pedder
Attorney, Agent, or Firm—Brooks & Kushman

[57] ABSTRACT

An adjustable sun visor which is capable of providing simultaneous glare protection for both the windshield and the side window. The visor is movable between a stowed position and one of three use modes. In the first use mode, glare protection is provided for the windshield. In the second use mode, glare protection is provided for the side window. And in the third use mode, glare protection is simultaneously provided for the windshield and a side window. The visor is formed from a first blade pivotally mounted to the vehicle by a mounting bracket. A second blade is affixed to the first blade and has a living hinge integrally formed therein enabling swinging movement of the second blade between a position contiguous with the first blade and a position away from the first blade to provide glare protection for the windshield when the visor is in the second use mode.

13 Claims, 2 Drawing Sheets

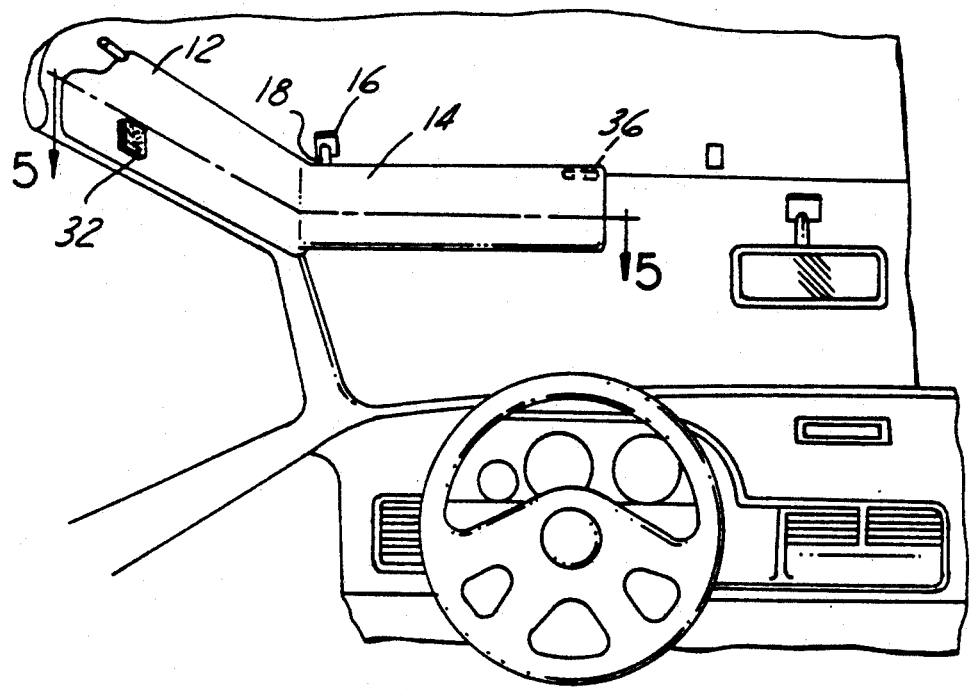
fig-4
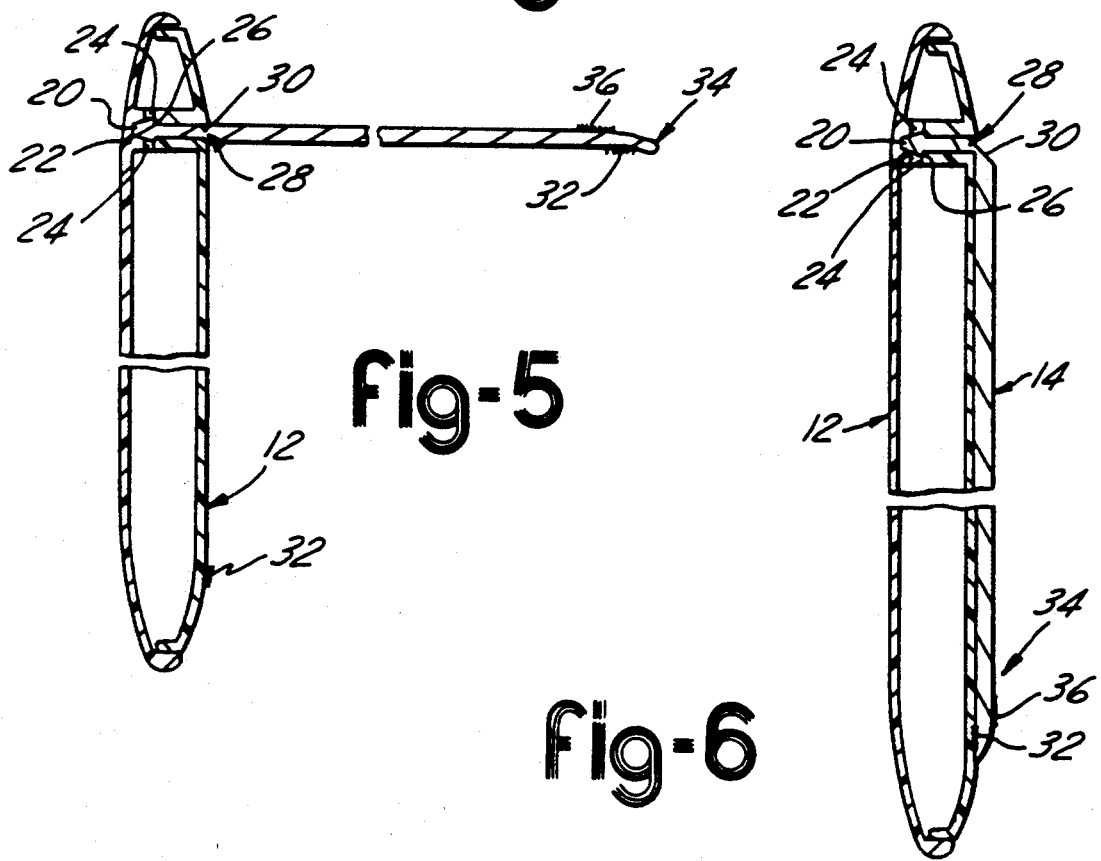
fig-5
fig-6

DUAL VISOR DESIGN FOR A VEHICLE

TECHNICAL FIELD

This invention relates to visors and, in particular, to a dual visor design for a vehicle.

BACKGROUND ART

Adjustable sun visors have been standard equipment on motor vehicles for many years. Generally, these visors were mounted to the upper interior surface of the vehicle by a mounting bracket, which secures the visor to the upper outside corner of the driver/passenger's compartment. Typically, visors may be pivoted from a lowered use position against the windshield to a side window if glare is entering the vehicle from the side. A problem exists when glare simultaneously enters from the windshield and the side window which traditional visors cannot accommodate.

Recently, visors have been developed to provide simultaneous protection against glare entering both the windshield and the side window. Three basic approaches have been utilized to overcome the problem of glare entering into the vehicle simultaneously from the windshield and the side window. The first such approach is disclosed in U.S. Pat. No. 4,950,021 to Van da Griff which discloses an adjustable sun visor attachment which is attachable to pre-existing visors of a vehicle. The adjustable visor is connected to the original visor which provides a second pivot around which a second visor pivots to prevent glare from the side window when original visor is lowered into the use position. Such a configuration requires an after-market addition to the original visor.

A second approach taken to provide simultaneous protection from glare entering the vehicle through the windshield and the side window is to provide a mounting bracket from which extends two separate pivot shafts, each of which contains a separate visor. Examples of such an approach are disclosed in U.S. Pat. No. 2,965,416 to Dryden; 3,556,585 to Binder; 4,521,047 to Saxman; 4,666,205 to Nakagawa; 4,762,359 to Boerema et al.; 4,858,982 to Dykstra et al.; 4,921,300 to Lawassani et al.; U.S. Pat. Nos. 4,681,363, 4,783,111, 4,925,232, 5,071,186, and 5,080,420 all to Hemmeke et al. These configurations require two pivot shafts to be secured to the mounting bracket.

An alternative approach which has been utilized in attempt to solve the above-referenced problem is disclosed in U.S. Pat. No. 4,570,991 to Lystad which discloses a pivot mount attached to a vehicle pillar disposed between the windshield and the side window. Two separate blades pivot upward about the pivot mount to a use position respectively located adjacent the windshield and the side window. Once in this position, each blade is affixed to releasable fixing members located along the headliner of the windshield and side window respectively. In this configuration, the blade covering the windshield is incapable of pivoting about an axis generally parallel with the headliner of the windshield.

A related approach is disclosed in U.S. Pat. No. 2,681,825 to DeLyra. DeLyra teaches of a smaller second blade which pivots about the pivot shaft of the pre-existing visor to provide limited partial protection in the corner between the side window and the windshield. In this configuration, the second blade does not provide adequate protection from glare entering from the side window.

The present invention incorporates many of the known benefits of dual visor designs for a vehicle while improving the visor system utilized to obtain simultaneous glare protection for the windshield and side window.

SUMMARY OF THE INVENTION

A visor system is presented for selectively providing simultaneous glare protection for the windshield and an adjacent side window of a vehicle. A visor is provided which has a first blade and a second blade. The second blade has a snap-fit means for interconnecting the second blade to the first blade and for hinging of the second blade to the first blade for movement of one of the first blade and the second blade relative to the other of the first blade and the second blade. A mounting bracket is provided for pivotally mounting the visor to the vehicle. The bracket allows pivotal movement of the visor between a stowed position and a plurality of use modes. The first of the use modes prevents glare from the windshield when the second blade moves with the first blade. A second of the use modes prevents glare from the side window when the second blade moves with the first blade. A third of the use modes prevents simultaneous glare protection for the windshield and the side window when one of the first blade and the second blade moves relative to the other of the first blade and the second blade while the visor is in the second of the use modes.

Additionally, a visor system is presented for selectively providing simultaneous glare protection for the windshield and an adjacent side window of the vehicle. A visor is provided which has a first blade and second blade such that the second blade includes a snap-fit means for interconnecting the second blade to the first blade and for hinging the second blade to the first blade. The second blade is movable relative to the first blade between a first position generally overlaying a portion of the first blade and a second position away from the first blade such that only a hinge end of the second blade is in contact with the first blade. A mounting bracket is provided for pivotally mounting the first blade to the vehicle. The bracket allows pivotal movement of the visor between a stowed position and a plurality of use modes. A first of the use modes prevents glare from the windshield. A second of the use modes prevents glare from the side window and a third of the use modes prevent simultaneous glare protection for the windshield and the side window through swinging of the second blade to the second position.

Accordingly, an object of the present invention is to provide an improved mounting bracket with a single pivot shaft for securely attaching a first blade of a visor capable of providing simultaneous glare protection for the windshield and an adjacent side window of the vehicle.

Another object of the present invention is to provide an improved dual visor design for a vehicle.

Still another object of the present invention is to provide an improved visor design wherein the visor has a first blade and a second blade such that the second blade has a hinge means for interconnecting the second blade to the first blade.

An advantage of the present invention is to utilize only one pivot shaft on the mounting bracket to secure the visor to the vehicle.

A feature of the present invention is to have only the first blade secured by the pivot shaft and have the second blade snap-fit to the first blade.

A specific object of the present invention is to provide a visor having a first blade and a second blade. The second blade has a snap-fit for interconnecting the second blade to the first blade for movement with the first blade. A hinge end of the second blade is snap-fit to the first blade for movement relative to the first blade. A mounting bracket is provided for pivotally mounting the visor to a vehicle. The mounting bracket allows pivotal movement of the visor between a stowed position and a plurality of use modes. A first of the use modes prevents glare from the windshield when the second blade moves with the first blade. A second use mode prevents glare from the side window when the second blade moves with the first blade. A third use mode prevents simultaneous glare protection for the windshield and the side window when the second blade moves relative to the first blade while the first blade is in the second of the use modes.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4 is a view similar to that shown in FIG. 3 showing the second blade of the visor pivoted away from the first blade in the third use mode in accordance with the present invention;

FIG. 5 is a cross-section of the visor taken along line 5—5 of FIG. 4 showing the second blade deployed and major elements of the invention; and FIG. 6 is a view similar to FIG. 5 showing the visor with the second blade adjacent the first blade.

BEST MODE FOR CARRYING OUT THE INVENTION

The preferred embodiment as shown in FIGS. 1 through 6, illustrates a visor 10 located within an interior of a vehicle. In the embodiment shown, the visor 10 is located on the operator's side of the vehicle. It is understood that a corresponding visor is provided on the passenger's side of the vehicle (not shown) which contains the same elements and operates in the same manner, but in mirror image thereof.

Figure 1:
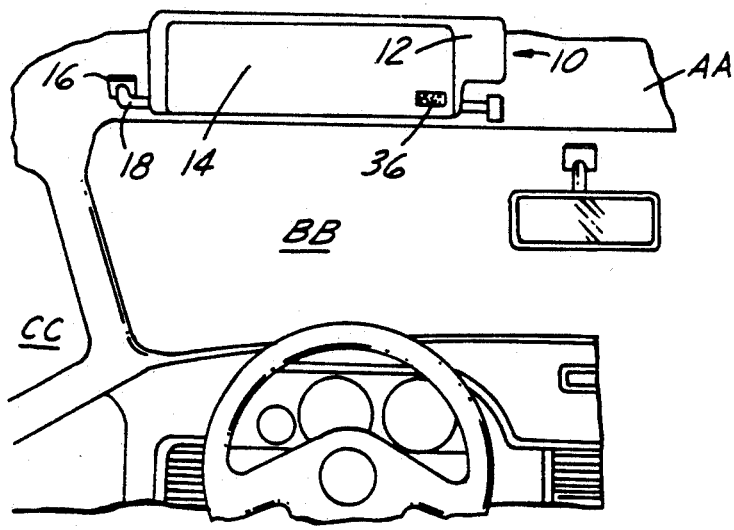
FIG. 1 is a view of the visor in a vehicle in the stowed position in accordance with the present invention.
Figure 2:
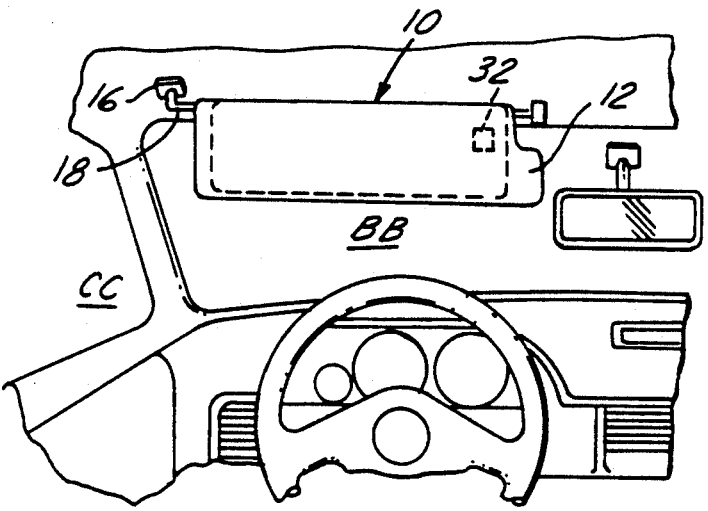
FIG. 2 is a view similar to that shown in FIG. 1, showing the visor lowered to the first use mode adjacent the windshield in accordance with the present invention.
Figure 3:
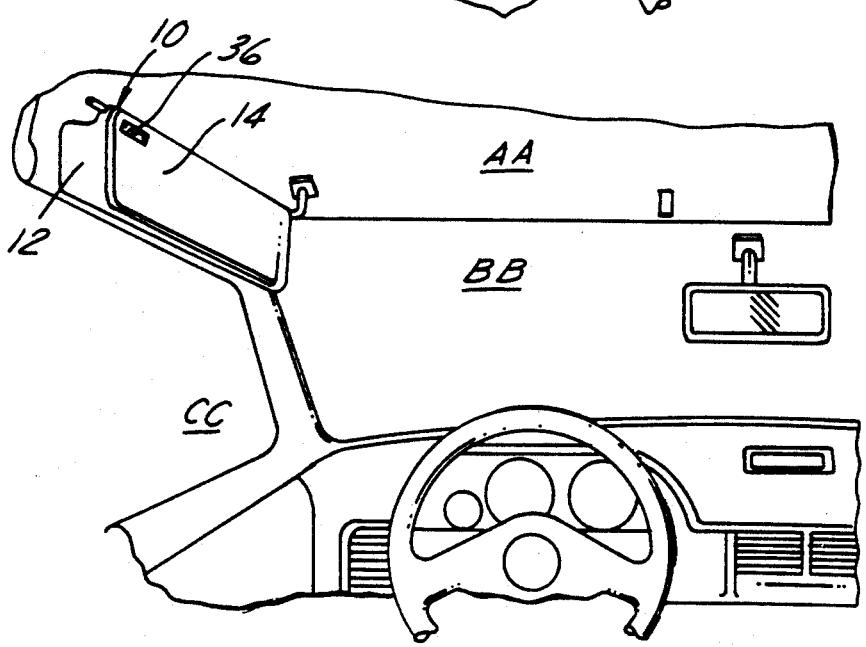
FIG. 3 is a view similar to that shown in FIG. 1, showing the visor adjacent the side window in the second use mode in accordance with the present invention.

As shown in FIG. 1, the visor 10 is located in a stowed position adjacent a headliner AA of the vehicle. The visor 10 is formed from a first blade 12 and a second blade 14, such that when the visor 10 is in the stowed position, the first blade 12 is adjacent the headliner AA and the second blade 14 overlays or is contiguous with the first blade 12.

The visor 10 is mounted to the vehicle by a mounting bracket 16 which is secured to the vehicle. The mounting bracket 16 has a single pivot arm 18 which extends therefrom and cooperates With the first blade 12 to pivotally secure it to the vehicle. The mounting bracket 16 in combination with the pivot shaft 18 enables the visor 10 to pivot between the stowed position shown in FIG. 1 and a first use mode illustrated in FIG. 2. When in the first use mode, the second blade 14 is hidden from view of the operator because it is located adjacent a windshield BB. The mounting bracket 16 also enables the visor 10 to pivot between the first use mode shown in FIG. 2 and a second use mode shown in FIG. 3.

In the second use mode, the first blade 12 is located at an adjacent side window CC and the second blade is located adjacent the interior of the vehicle. In the first use mode, the visor 10 prevents glare from the windshield BB. When in the second use mode, the visor prevents glare from the side window CC.

The first blade 12, as shown in FIGS. 1 through 6 is relatively larger than the second blade 14. It is only the first blade 12 which is secured to the mounting bracket 16 by the pivot shaft 18 and not the entire visor 10. The second blade 14 overlays the first blade 14, or is contiguous therewith, in both the stowed position and the first and second use modes. As may be seen in FIGS. 5 and 6, the second blade 14 is interconnected with the first blade 12 by a dart 20. The dart 20 is affixed to the second blade 14 and cooperates with an aperture 22 located within the first blade 12. The aperture 22 is configured so as to include shoulders 24 which cooperate with corresponding abutting surfaces 26 located on the dart 20 to retain the dart 20 once it has been seated within the aperture 22.

As shown in FIGS. 5 and 6, located at a pivot end 28 of the second blade 14, is a hinge means (in this embodiment a living hinge 30), which enables the second blade 14 to move between overlaying the first blade 12 and swinging away from the first blade 12. The living hinge 30 is integrally formed in the second blade 14. A releasable fastening means 32 (in this embodiment a hook and loop fastener), is located at a free end 34 of the second blade 14 allowing the second blade 14 to remain securely fastened to the first blade 12 when the visor is moved between the stowed position and the first and second use modes. Any releasable fastener which enables the second blade 14 to remain contiguous with the first blade 12 during movement therewith while allowing the second blade 14 to swing away from the first blade when desired will be an acceptable substitute. A key feature of the fastening means 32 is that the connection and disconnection of the fastening means 32 must be quickly and easily made with one hand without requiring the focused attention of the vehicle operator.

FIGS. 4 and 5 illustrate the visor in the third use mode which simultaneously protects the operator from glare from the windshield BB and the adjacent side window CC. To obtain such simultaneous protection, the first blade 12 is pivoted to the second use mode. Then, the second blade 14 is pivoted away from the first blade 12, toward the windshield BB, by means of the living hinge 30 and by overcoming the fastening means 32. A releasable retention means 34 (in this embodiment the hook portion of a hook and loop fastener) cooperates with the headliner AA to retain the second blade 14 adjacent the headliner AA when in the third use mode to prevent the second blade 14 from inadvertently moving away from the headliner AA as a result of movement of the vehicle. In the second use mode, the first blade 12 is provided with limited pivotal movement in a plane generally parallel to the side window to improve the glare protection from the side window. This limited pivotal movement of the first blade 12 also effects the positioning of the second blade 14 on the windshield BB when in the third use mode. This limited pivoting movement of the first blade 12 in the third use mode enables the operator to adjust the glare protection provided by the second blade 14.

In operation, the operator of the vehicle is able to provide protection against glare from the windshield BB by pivoting the visor 10 from the stowed position into the first use mode. If glare protection is needed from the side window CC then the visor 10 may be pivoted to the side window CC. Should it be desirable to provide simultaneous glare protection from both the windshield BB and the side window CC then the second blade 14 is pivoted away from the first blade 12 toward the windshield CC. When glare protection is not required, the operator pivots the visor 10 to the stowed position adjacent the headliner AA.

The embodiment shown in FIGS. 1 through 6 may easily accommodate a mirror (not shown) located on the first blade 12 of the visor 10. An alternative embodiment (not shown) allows for the second blade 14 to be located on the reverse side of the visor 10 provided the visor 10 does not include a mirror. Operation of the visor 10 in this alternative embodiment would be identical to that of the preferred embodiment illustrated in FIGS. 1 through 6 with the exception of the third use mode. In the third use mode, the second blade 14 would remain adjacent to the side window CC wherein the retention means 34 would cooperate with the liner of the vehicle adjacent to the side window CC and the first blade 12 would be moved to the windshield BB. In addition, the limited pivotal movement of the first blade 12 in the third use mode (previously referred to with regard to the preferred embodiment) effects the positioning of the second blade 14 on the side window CC rather than against the windshield BB.

While the best mode for carrying out the invention has been described in detail, those familiar with the art to which this invention relates will recognize various alternative designs and embodiments for practicing the invention as defined by the following claims.

What is claimed is:

1. A visor system for selectively providing simultaneous glare protection for a windshield and an adjacent side window of a vehicle, said visor system comprising:
   a visor having a two-sided first blade and a second blade, said second blade having snap-fit means for interconnecting said second blade to said first blade for movement with said first blade and for hinging of said second blade to said first blade for movement of one of said first blade and said second blade relative to the other of said first blade and said second blade;
   said first blade having an aperture on one of its two sides including a shoulder within said aperture;
   said snap-fit means including a dart insertable into said aperture for cooperating with said shoulder for retaining said second blade on said one of the two sides of said first blade; and
   a mounting bracket including pivot means for pivotally mounting said visor to said vehicle, said pivot means allowing pivotal movement of said visor between a stowed position and a plurality of use modes, a first of said use modes preventing glare from the windshield when said second blade moves with said first blade, a second of said use modes preventing glare from the side window when said second blade moves with said first blade, and a third of said use modes providing simultaneous glare protection for the windshield and the side window when one of said first blade and said second blade moves relative to the other of said first blade and said second blade while said visor is in said second of said use modes.

2. The visor system according to claim 1 wherein said visor further includes fastening means for releasably fastening a free end of said second blade to said first blade, said fastening means cooperating with said snap-fit means allowing movement of said second blade between a first position contiguous with said first blade and a second position away from said first blade.

3. The visor system according to claim 1 wherein said fastening means includes a releasable connection between said first blade and said free end of said second blade.

4. A visor system for selectively providing simultaneous glare protection for a windshield and an adjacent side window of a vehicle, said visor system comprising:
   a visor having a first blade and a second blade, said second blade having snap-fit means for interconnecting said second blade to said first blade for movement with said first blade and for hinging of said second blade to said first blade for movement of one of said first blade and said second blade relative to the other of said first blade and said second blade; and
   a mounting bracket including pivot means for pivotally mounting said visor to said vehicle, said bracket pivot means allowing pivotal movement of said visor between a stowed position and a plurality of use modes, a first of said use modes preventing glare from the windshield when said second blade moves with said first blade, a second of said use modes preventing glare from the side window when said second blade moves with said first blade, and a third of said uses modes providing simultaneous glare protection for the windshield and the side window when one of said first blade and said second blade moves relative to the other of said first blade and said second blade while said visor is in said second of said use modes, wherein said snap-fit means includes a living hinge integrally formed in said second blade, said living hinge including a dart cooperating with a seat located in said first blade for affixing a hinge end of said second blade to said first blade.

5. The visor system according to claim 1 wherein said second blade is relatively smaller than said first blade.

6. The visor system according to claim 1 wherein said second blade further includes releasable retention means for retaining said second blade adjacent one of the windshield and the side window when in said third of said use modes.

7. The visor system according to claim 1 wherein said pivot means of said mounting bracket enables limited pivotal movement of said one of said first and second blades in a generally vertical plane when said other of said first and second blades is pivoted in said third of said use modes.

8. A visor system for selectively providing simultaneous glare protection for the windshield and an adjacent side window of a vehicle, said visor system comprising:
   a visor having a two-sided first blade and a second blade, said second blade having snap-fit means for interconnecting said second blade to said first blade and for hinging of said second blade to said first blade, and said second blade movable relative to said first blade between a first position generally overlaying a side of said first blade and a second position away from said first blade such that only a hinge end of said second blade is in contact with said blade;

said first blade having an aperture on one of its two sides including a shoulder within said aperture;

said snap-fit means including a dart insertable into said aperture for cooperating with said shoulder for retaining said second blade on said one of the two sides of said first blade; and a mounting bracket including pivot means for pivotally mounting said first blade to said vehicle, said pivot means allowing pivotal movement of said visor between a stowed position and a plurality of use modes, a first of said use modes preventing glare from the windshield, a second of said use modes preventing glare from the side window, and a third of said use modes providing simultaneous glare protection for the windshield and the side window through swinging one of said first blade and said second blade to said second position.

9. The visor system according to claim 8 wherein said visor further includes fastening means for releasably fastening a free end of said second blade to said first blade, said fastening means cooperating with said snap-fit means allowing movement of said one of said first blade and said second blade between a first position contiguous with the other of said first blade and said second blade and a second position away from the other of said first blade and said second blade.

10. A visor system for selectively providing simultaneous glare protection for the windshield and an adjacent side window of a vehicle, said visor system comprising:

a visor having a first blade and a second blade, said second blade having snap-fit means for interconnecting said second blade to said first blade and for hinging of said second blade to said first blade, and said second blade movable relative to said first blade between a first position generally overlaying a portion of said first blade and a second position away from said first blade such that only a hinge end of said second blade is in contact with said first blade; and a mounting bracket including pivot means for pivotally mounting said first blade to said vehicle, said pivot means allowing pivotal movement of said visor between a stowed position and a plurality of use modes, a first of said use modes preventing glare from the windshield, a second of said use modes preventing glare from the side window, and a third of said use modes providing simultaneous glare protection for the windshield and the side window through swinging said second blade to said second position, wherein said snap-fit means includes a living hinge integrally formed in said second blade, said living hinge including a dart cooperating with a seat located in said first blade for affixing said hinge end of said second blade to said first blade.

11. The visor system according to claim 8 wherein said second blade is relatively smaller than said first blade.

12. The visor system according to claim 8 wherein said second blade further includes releasable retention means for retaining said second blade adjacent one of the windshield and the side window when in said third of said use modes.

13. The visor system according to claim 8 wherein said pivot means of said mounting bracket enables limited pivotal movement of said one of said first and second blades in a generally vertical plane when said other of said first and second blades is pivoted in said third of said use modes.

* * * * *